United States Patent [19]

Stickley

[11] Patent Number: 4,781,983

[45] Date of Patent: Nov. 1, 1988

[54] METHOD FOR PREPARING ANTISTATIC EXPANDABLE POLYSTYRENE

[75] Inventor: Susan G. Stickley, West Chester, Pa.

[73] Assignee: Arco Chemical Company, Newtown Square, Pa.

[21] Appl. No.: 144,906

[22] Filed: Jan. 19, 1988

Related U.S. Application Data

[63] Continuation-in-part of Ser. No. 44,862, Apr. 30, 1987.

[51] Int. Cl.$^4$ .......................... B32B 5/16; B05D 7/00; C08J 9/22
[52] U.S. Cl. ................................ 428/407; 427/212; 427/222; 521/56; 521/57
[58] Field of Search .................... 521/56, 57; 428/407; 427/222

[56] References Cited

U.S. PATENT DOCUMENTS

| | | | |
|---|---|---|---|
| 4,238,570 | 12/1980 | Shibata et al. | 521/57 |
| 4,281,036 | 7/1981 | Leithäuser et al. | 427/222 |
| 4,495,224 | 1/1985 | Rigler et al. | 427/222 |
| 4,588,751 | 5/1986 | Ingram | 521/57 |
| 4,599,366 | 7/1986 | Kesling et al. | 521/57 |
| 4,626,554 | 12/1986 | Di Giulio | 521/57 |

Primary Examiner—Thurman K. Page
Attorney, Agent, or Firm—Lewis J. Young

[57] ABSTRACT

Quaternary ammonium salts which act as antistatic agents for styrene polymers are coated on the expandable polymer particles in the form of an organosol. The hydrocarbon medium from the organosol is removed under vacuum and the coated polymer particles are molded.

9 Claims, No Drawings

METHOD FOR PREPARING ANTISTATIC EXPANDABLE POLYSTYRENE

RELATED APPLICATIONS

This application is a continuation-in-part of application Ser. no. 044,862 filed Apr. 30, 1987.

BACKGROUND OF THE INVENTION

The field of the invention is expandable styrene polymer particles for the preparation of molded articles. The present invention is particularly concerned with coating the particulate, expandable styrene polymers with organosols containing quaternary ammonium salts and using the coated expandable styrene polymers in making molded articles.

Expandable styrene polymers, like most plastics, are an insulator with low surface conductivity. As a result, they pick up and hold static electricity for extended periods of time. An effective antistatic treatment for expandable styrene polymers must provide a webb of ionic and/or hydrophilic pathways through which a charge can be dissipated. These pathways are most effective as a network throughout the molded part rather than as a molded part surface coating, as in the dipping procedure. Antistatic agents do not readily adhere to the expandable bead surface in most coating procedures and are easily removed from the beads during the expansion and molding processes. Due to the sensitive nature of suspension stability in polymerization and impregnation, antistat addition during these steps is not practical.

U.S. Pat. No. 4,495,224 teaches to prepare expandable styrene polymers having improved molding characteristics by coating the polymer particles with glycerin esters of long chain fatty acids. The coating is made by forming organosols with pulverulent glycerin esters in aliphatic hydrocarbons.

BRIEF SUMMARY OF THE INVENTION

It has now been found that excellent antistatic properties can be obtained with expandable styrene polymer particles by coating the particles with an organosol made from glyceryl esters and quaternary ammonium salts dispersed in a normal or cyclic aliphatic hydrocarbon or blends thereof, with or without an aromatic component. The organosol gives uniform coating to the particles and subsequent molding give parts having antistatic composition both on the surface and throughout the molding due to the internal coating on the particles which produces a network effect for electrostatic charge disipation.

DETAILED DESCRIPTION OF THE INVENTION

The invention involves a method for coating expandable styrene polymer particles with quaternary ammonium salts comprising:

(a) introducing said expandable styrene polymer particles into a closed mixing vessel;

(b) preparing organosols of said quaternary ammonium salts and mixed glyceryl esters of long chain fatty acids in normal or cyclic aliphatic hydrocarbons or blends thereof, with or without an aromatic component;

(c) adding said organosols to said expandable styrene polymer particles with mixing;

(d) removing said hydrocarbons by reducing the pressure in said mixing vessel; and (e) separating said expandable styrene polymer particles coated with said quaternary ammonium salts.

In accordance with this invention, a variety of expandable thermoplastic homopolymers and copolymers can be rendered antistatic. The polymers may be derived from vinyl aromatic monomers including styrene, isopropylstyrene, alphamethylstyrene, nuclear methylstyrenes, chlorostyrene, tertbutylstyrene, etc., as well as copolymers prepared by the copolymerization of a vinyl aromatic monomer with monomers such as butadiene, alkyl methacrylates, alkyl acrylates, acrylonitrile, and maleic anhydride wherein the vinyl aromatic monomer is present in at least 50% by weight of the copolymer. For the purpose of convenience, these polymers and copolymers are referred to herein as "styrene polymers".

Especially useful are polystyrene, and copolymers of styrene with 5–30 weight percent of acrylonitrile, maleic anhydride, or methyl acid maleate.

The styrene polymers may be in the form of beads, granules, or other particles convenient for the expansion and molding operations. Especially useful are the beads formed by the suspension polymerization of the vinyl aromatic monomers alone or in combination with the minor amount of copolymerizable monomers. The styrene polymers can, of course, be produced by any of the known procedures. The preferred method of preparation is the suspension technique, which gives bead or pellet shaped product.

The styrene polymer particles may be made expandable by impregnating the styrene polymer particles with a suitable blowing agent. The beads can be recovered from a polymerization process and resuspended in water for impregnation or the impregnation can be performed directly on the polymerized beads without separation.

To render the polymer particles expandable, the blowing agent may be incorporated into the particles, as for example in U.S. Pat. No. 2,983,692, by suspending the particles in water in a ratio of between 0.3 to 1 and 1.5 to 1 (polymer-to-water) with the aid of suspending agent systems such as tricalcium phosphate in combination with a surfactant to promote wetting.

During the impregnation of the particles with blowing agent, other additives can also be incorporated, such as internal fast-cool agents, pigments and dyes, stabilizers, anti-lump agents, self-extinguishing agents, plasticizers, and the like.

The impregnation is conventionally carried out at temperatures ranging from about 80° to 150° C. Increasing the temperature makes the impregnation proceed at a faster rate.

The blowing agents are compounds which are gases or which form gases on heating. Preferred blowing agents include aliphatic hydrocarbons containing from 4–6 carbon atoms in the molecule, such as butanes, pentanes, hexanes, and the halogenated hydrocarbons which boil at a temperature below the softening point of the polymer. Mixtures of these agents may also be used, such as a mixture of 40–60% n-pentane and 60–40% trichlorofluoromethane. Usually from 3–20% of blowing agent per 100 parts of polymer is incorporated by the impregnation.

The particular quaternary ammonium salt useful in the invention is not critical. The salt must be dispersible or soluble in the organosol paste and must be an antistat for the polymer to which it is applied. Examples of suitable salts are methyl tricaprylyl ammonium chloride (sold as Aliquat 336 by Henkel Corp.), dicoco alkyl dimethyl ammonium chlorides (sold as Arquad 2C-75 by Armak Chemicals), soya dimethyl ethyl ammonium ethylsulfate (sold as Larostat 264A by Jordan Chemical Co.), coco alkylethyl dimethyl ammonium ethylsulfate (sold as Larostat 377DPG by Jordan Chemical Co.), trialkyl alkylalkoxylated ammonium salts, and dialkyl bisalkoxylated ammonium salts (these latter two salts made and claimed in U.S. Pat. Nos. 4,622,345 and 4,628,068).

The organosols are made by starting with a mixture of normal or cyclic aliphatic hydrocarbon or blends thereof, with or without an aromatic component and about 10% glyceryl esters of long chain fatty acids and then adding 2–40% of quaternary ammonium salt. It is equally possible to use a commercially available mixture of the mono-, di-, and tri-fatty acid esters of glycerin in amounts to give about 10–20% by weight of the glyceryl esters based on total organosol. There is no particular order of addition of the ingredients which must be followed. The fatty acids useful herein have from about 10 to about 18 carbon atoms in their chain. All solid ingredients of the organosol should be small (particle size less than 100 microns) for ease of dispersion. The preferred hydrocarbon is pentane and may be any of the isomeric pentanes or mixtures of them. The use of fatty acid soaps, such as zinc stearate, enhances the stability of the organosol and serves to plasticize the polymers. Fine silica can also be added to the organosol to help lubricate the beads during molding. The fine silica and/or the zinc stearate can also be dry blended onto the beads which have been coated by the organosol.

The coating formed on the styrene polymer beads by this procedure is made up of long chain fatty acids in a volatile hydrocarbon base, which improves the adhesion of the antistatic agent to the beads.

The following examples are meant to illustrate, but not limit the invention. All parts and percentages are by weight unless otherwise designated.

EXAMPLE I

To illustrate the range of quaternary ammonium compound which can be applied to the polymer beads a series of antistatic pastes were made up as follows:

To 135 g of n-pentane in a bottle equipped with a magnetic stirrer was added 11.4 g of methyl tricaprylyl ammonium chloride and the mixture stirred until well dispersed. To the mixture was then added 7.5 g of glyceryl tristearate and 7.5 g of glyceryl monostearate and again stirred until well dispersed.

The paste (10.75 g) was added to 250 g of polystyrene beads having a particle size of through 16 and on 35 mesh (U.S. Standard Sieve) and tumbled for 30 min to give beads having 3000 ppm of antistat. The beads were then tray dried for about 15 min. and then pre-expanded to a density of about 1.3 pcf in a Buccaneer pre-expander. The samples were then compression molded into samples for the ETS Static Decay Meter, and tested for rate of static decay of the sample.

The control sample was prepared in the identical manner, but leaving out the quaternary compound.

Other samples were prepared and treated using 3.8 g, 7.6 g, and 15.2 g of quaternary compound to give final polymer discs containing 1000, 2000 and 4000 ppm of antistat. The results of the testing are shown in Table I.

TABLE I

| | e.t.s. Static Decay of +5 and −5 KV | | |
|---|---|---|---|
| Antistat Level (ppm) | Initial Charge (Kv) | Decay of 2.5 Kv. (Sec) | Decay of 4.5 Kv. (Sec) |
| Control | 4.25 | — | — |
| 1000 | 0.15 | 0.035 | 3.01 |
| 2000 | 0.05 | 0.01 | 0.46 |
| 3000 | 0.10 | 0.015 | 0.725 |
| 4000 | 0.05 | 0.01 | 0.24 |

It can be seen from the data that the antistats are effective from 1000 to 4000 ppm in the polymer. It should be noted, however, that at concentrations above 3000 ppm for this particular organosol pasted sample, a high amount of soft agglomerations occurred which could lead to impaired bead flow properties.

EXAMPLE II

To illustrate the use of different quaternary ammonium compounds, with and without a flow agent, various pastes were prepared as in Example I using the salt and concentration listed in Table II. Where flow agents were used, the flow agent was applied to the polymer beads by dry blending after application of the antistatic paste. Results are shown in Table II.

TABLE II

| | e.t.s. Static Decay of +5 and −5 KV | | | |
|---|---|---|---|---|
| Antistat | Antistat Level (ppm) | Initial Charge (Kv) | Decay of 2.5 Kv. (Sec) | Decay of 4.5 Kv. (Sec) |
| Control | — | 4.25 | No decay | |
| Methyl Tricaprylyl Ammonium Chloride | 3000 | 0.10 | 0.015 | 0.725 |
| | 2900 | 0.00 | 0.015 | 0.39 |
| | 2900* | 0.05 | 0.015 | 0.405 |
| | 2900** | 0.075 | 0.03 | 1.19 |
| Soya Dimethyl Ethyl Ammonium Ethylsulfate | 3000* | 0.00 | 0.035 | 2.275 |
| Coco Alkylethyl Di-Methyl ammonium Ethylsulfate | 2000* | 0.00 | 0.01 | 0.35 |
| Dicoco Alkyldimethyl Ammonium Chlorides | 2000 | 0.20 | 0.075 | 4.74 |
| | 3000 | 0.50 | 0.335 | 200.35 |
| Isostearamidopropyl ethyl dimethyl ammonium ethylsulfate | 2000* | 0.007 | 0.05 | 6.66 |

*2000 ppm Silene added
**2000 ppm zinc stearate added

EXAMPLE III

To illustrate the adherence of the antistat to the surface of the particles 2200 ppm of coco alkylethyl dimethyl ammonium ethylsulfate was coated onto particles of polystyrene which had been impregnated prior to separation from the polymerization reactor by the method of this invention and by normal dryblend coating methods and then washed with water. The static results as shown in Table III.

TABLE III

| | e.t.s. Static Decay of +5 and −5 KV | | | |
|---|---|---|---|---|
| Method of Application | Antistat Level (ppm) | Initial Charge (Kv) | Decay of 4.5 Kv. (Sec) | Decay of 4.55 Kv. (Sec) |
| Control | — | 3.00 | No decay | |
| Invention (unwashed) | 2200 | 0.00 | 0.09 | 0.35 |
| Invention (washed) | 2200 | 0.00 | 0.10 | 0.38 |
| Direct blend | 2200 | 0.00 | 0.06 | 0.28 |
| Direct blend (washed) | 2200 | 0.00 | 0.93 | 6.88 |

Similar results were obtained starting with beads prepared by separation from the polymerization reactor, screened and impregnated. It can be seen from the results that washing the beads coated by direct dry-blending causes the antistat to disappear. On the other hand, washing the beads from the invention caused little or no decay of antistat properties.

I claim:

1. A method for preparing expandable styrene polymer particles with an adherent coating of quaternary ammonium salts comprising:
    (a) introducing said expandable styrene polymer particles into a closed mixing vessel;
    (b) preparing organosols of said quaternary ammonium salts and glyceryl esters of long chain fatty acids in normal or cyclic aliphatic hydrocarbons or blends thereof, with or without an aromatic component;
    (c) adding said organosols to said expandable styrene polymer particles with mixing;
    (d) removing said aliphatic hydrocarbons by reducing the pressure in said mixing vessel; and
    (e) separating said expandable styrene polymer particles coated with said quaternary ammonium salts.

2. The method of claim 1 wherein the organosol contains 2 to 40% by weight based on total organosol of the quaternary ammonium salt, and about 10% to about 20% by weight of a mixture of mono-, di- and tri-fatty acid esters of glycerin, with the remainder being a normal or cyclic aliphatic hydrocarbon or blends thereof, with or without an aromatic component.

3. The method of claim 2 wherein the organosol contains an additional 1000 to 4000 ppm of a flow agent.

4. The method of claim 3 wherein the flow agent is zinc stearate.

5. The method of claim 3 wherein the flow agent is fine silica.

6. The method of claim 1 wherein the organosol contains 2 to 40% by weight based on total organosol of the quaternary ammonium salt, and about 10% to about 20% by weight of a mixture of mono-, di- and tri-stearates of glycerin, with the remainder being n-pentane, isopentane, cyclopentane, or a mixture thereof.

7. The method of claim 1 wherein the quaternary ammonium salt is selected from the group consisting of methyl tricaprylyl ammonium chloride, dicoco alkyl dimethyl ammonium chloride, soya dimethyl ethyl ammonium ethylsulfate, coco alkylethyl dimethyl ammonium ethylsulfate, isostearamidopropyl ethyl dimethyl ammonium ethylsufate, trialkyl alkylalkoxylated ammonium salts, and dialkyl bisalkoxylated ammonium salts.

8. Expandable styrene polymer particles having an adherent coating of one or more quaternary ammonium salts and one or more long chain fatty acid glycerides.

9. The particles of claim 8 wherein said fatty acid ester is a mixture of mono-, di-, and tri-stearates of glycerin.

* * * * *